No. 789,280. PATENTED MAY 9, 1905.
F. B. HOWELL.
SECTIONAL BOILER.
APPLICATION FILED JAN. 14, 1905.

9 SHEETS—SHEET 2.

Witnesses.
Chas. B. Gillson.
Chw. H. Yagle.

Inventor.
Frank B. Howell.
By Louis T. Liss
Atty.

No. 789,280. PATENTED MAY 9, 1905.
F. B. HOWELL.
SECTIONAL BOILER.
APPLICATION FILED JAN. 14, 1905.

9 SHEETS—SHEET 3.

Witnesses.
Chas. B. Gillson.
Chas. H. Yagle.

Inventor.
Frank B. Howell.
By Louis A. Liesen
Atty.

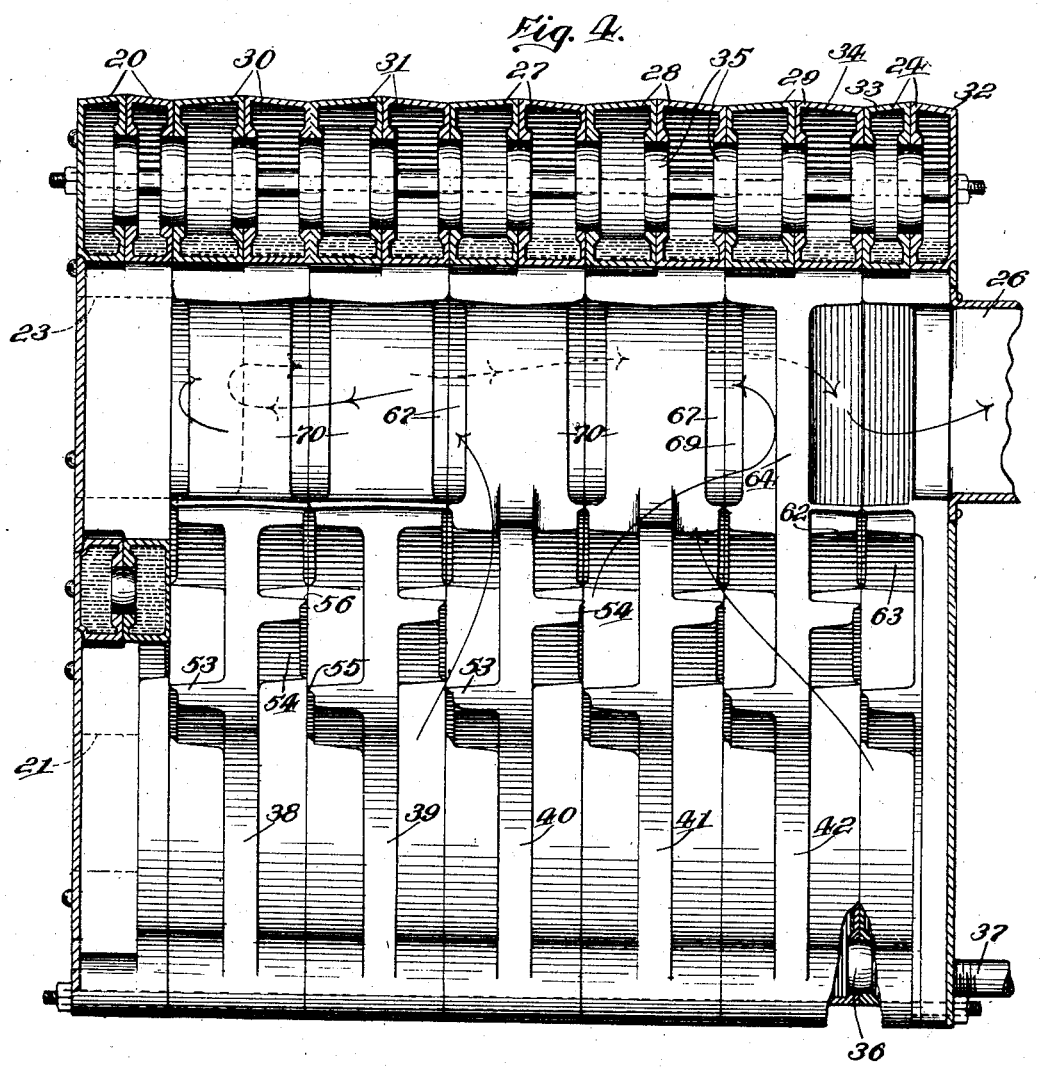

No. 789,280. PATENTED MAY 9, 1905.
F. B. HOWELL.
SECTIONAL BOILER.
APPLICATION FILED JAN. 14, 1905.
9 SHEETS—SHEET 5.
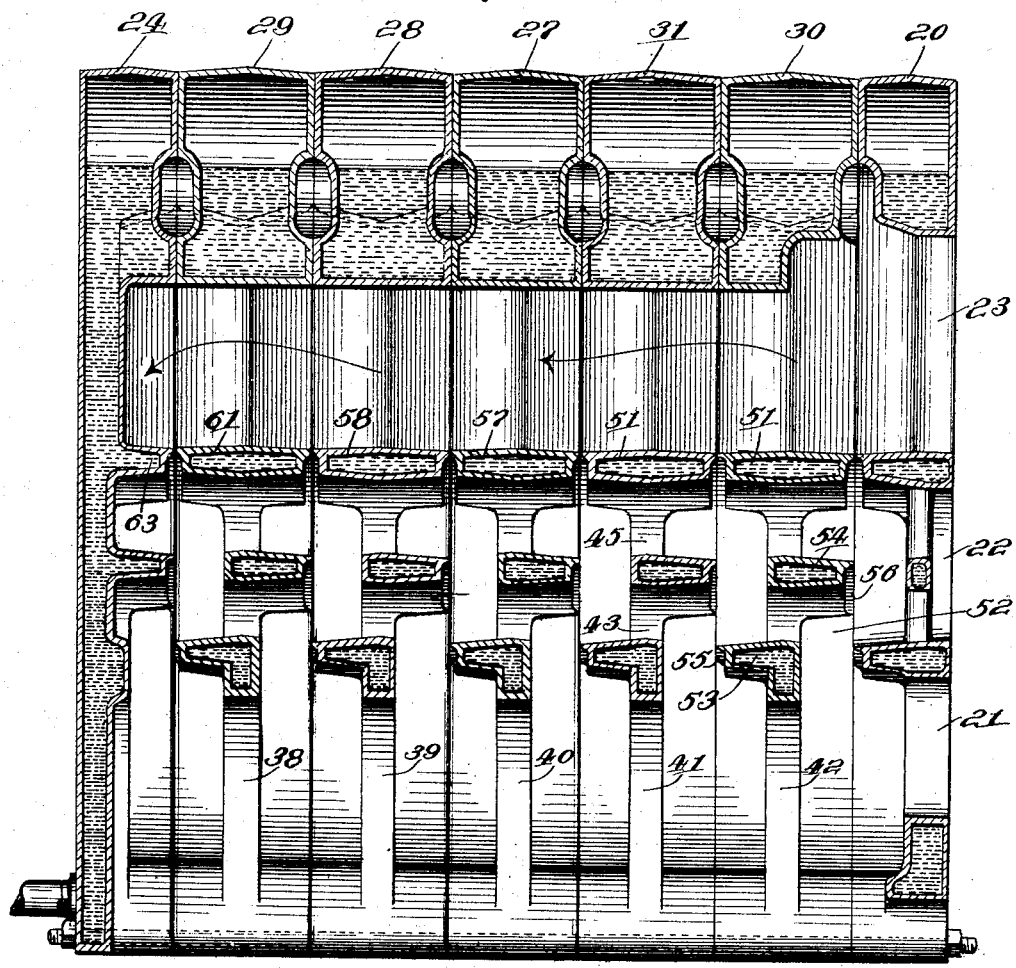

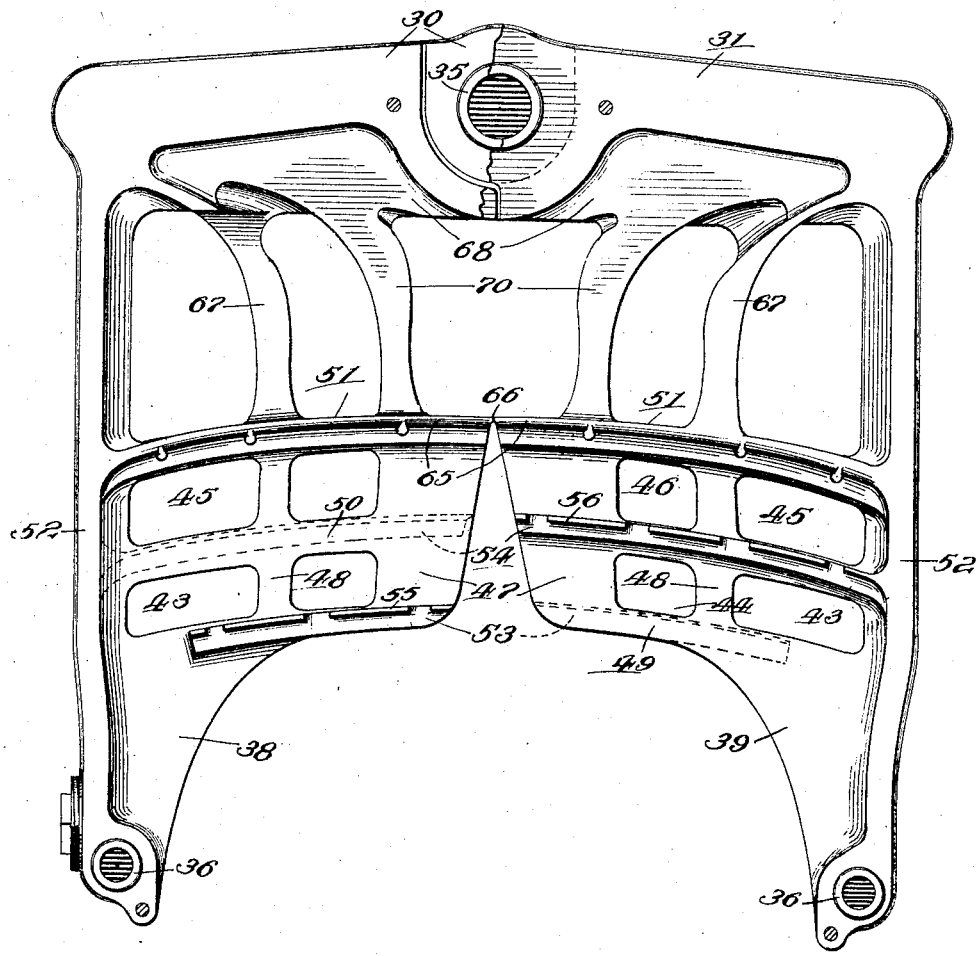

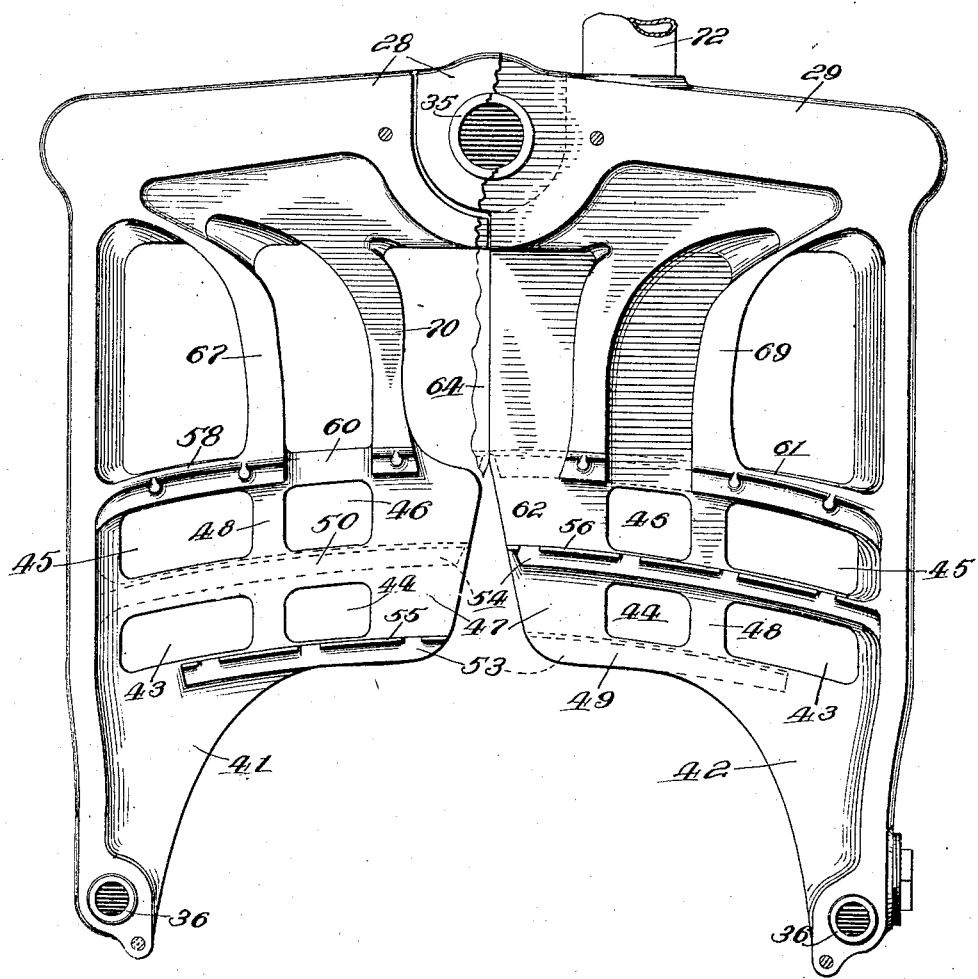

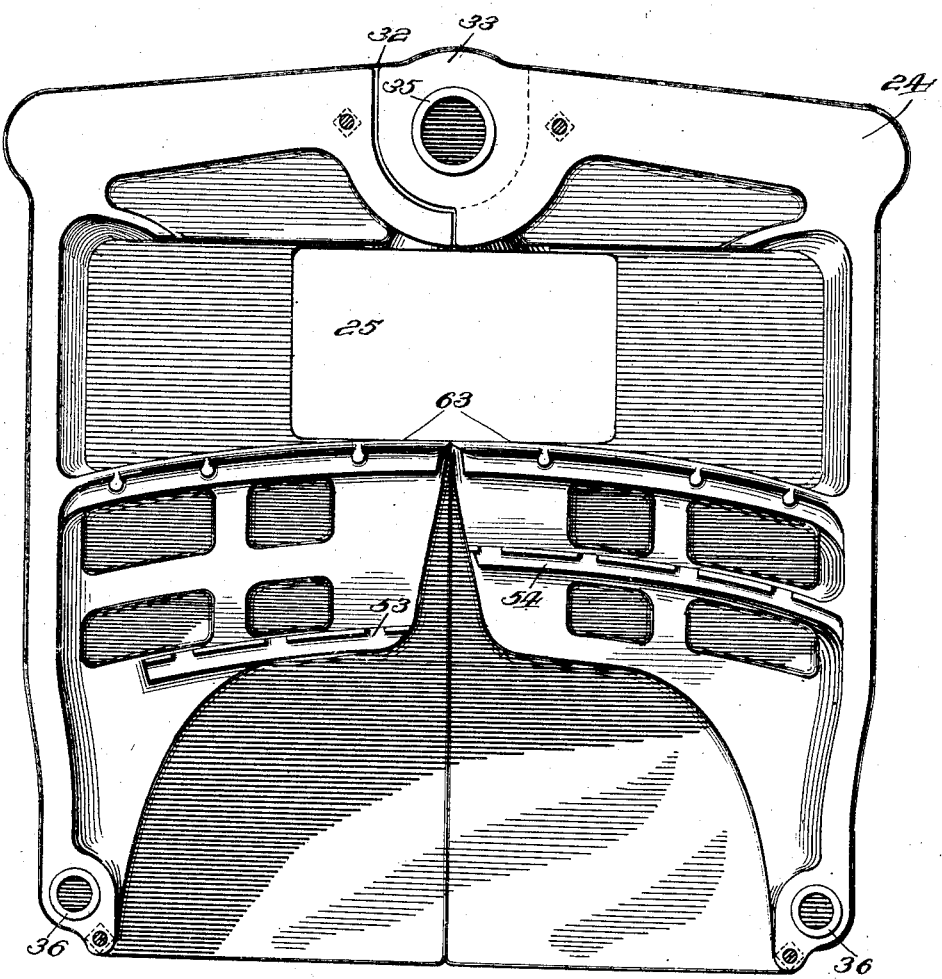

No. 789,280. PATENTED MAY 9, 1905.
F. B. HOWELL.
SECTIONAL BOILER.
APPLICATION FILED JAN. 14, 1905.
9 SHEETS—SHEET 9.
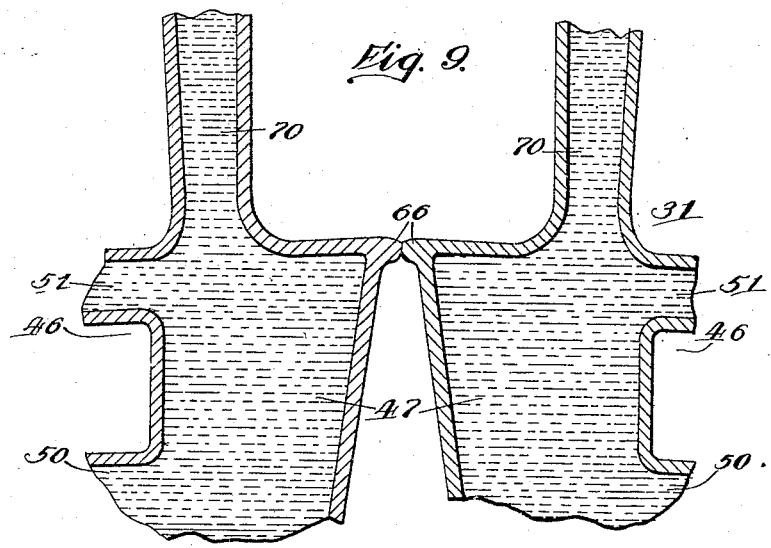
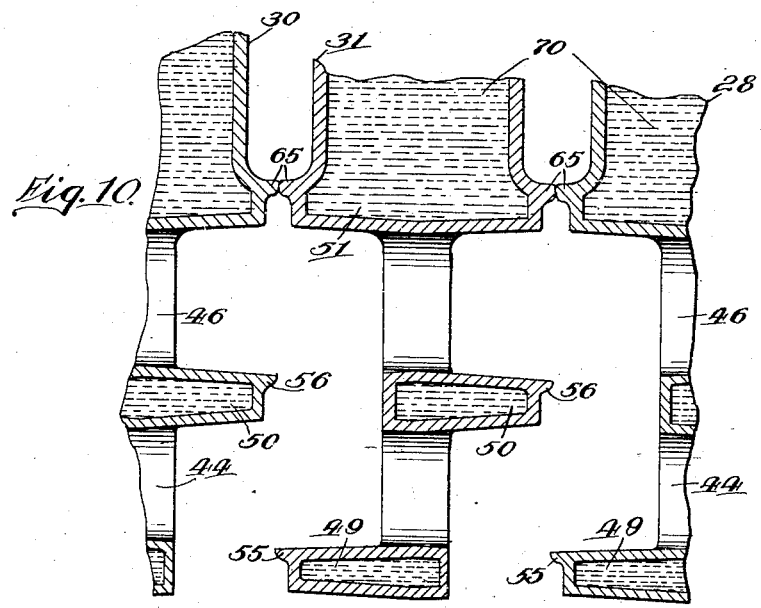
Witnesses:
Chas. B. Gillson
Inventor:
Frank B. Howell.
By Louis K. Gregory
Atty.

No. 789,280.

Patented May 9, 1905.

UNITED STATES PATENT OFFICE.

FRANK B. HOWELL, OF BUFFALO, NEW YORK, ASSIGNOR TO AMERICAN RADIATOR COMPANY, A CORPORATION OF NEW JERSEY.

SECTIONAL BOILER.

SPECIFICATION forming part of Letters Patent No. 789,280, dated May 9, 1905.

Application filed January 14, 1905. Serial No. 241,145.

*To all whom it may concern:*

Be it known that I, FRANK B. HOWELL, a citizen of the United States, and a resident of Buffalo, county of Erie, and State of New York, have invented certain new and useful Improvements in Sectional Boilers, of which the following is a specification and which are illustrated in the accompanying drawings, forming a part thereof.

The invention relates to the horizontal type of boilers, such as are used in the generation of steam or the heating of water for the purpose of heating buildings, the boiler being composed of a plurality of hollow sections assembled so as to form a unitary structure having circulating-passages for the water, a fire-box, and flues for the escape of the products of combustion.

The prime object of the invention is to increase the efficiency of boilers of this type relatively to their size and weight; and this object is accomplished by the general arrangement of the water-circulating passages and of the flue-passages and by various details whereby the extent of the radiant heating-surface is increased, all as hereinafter described, and as illustrated in the accompanying drawings, in which—

Figure 1:
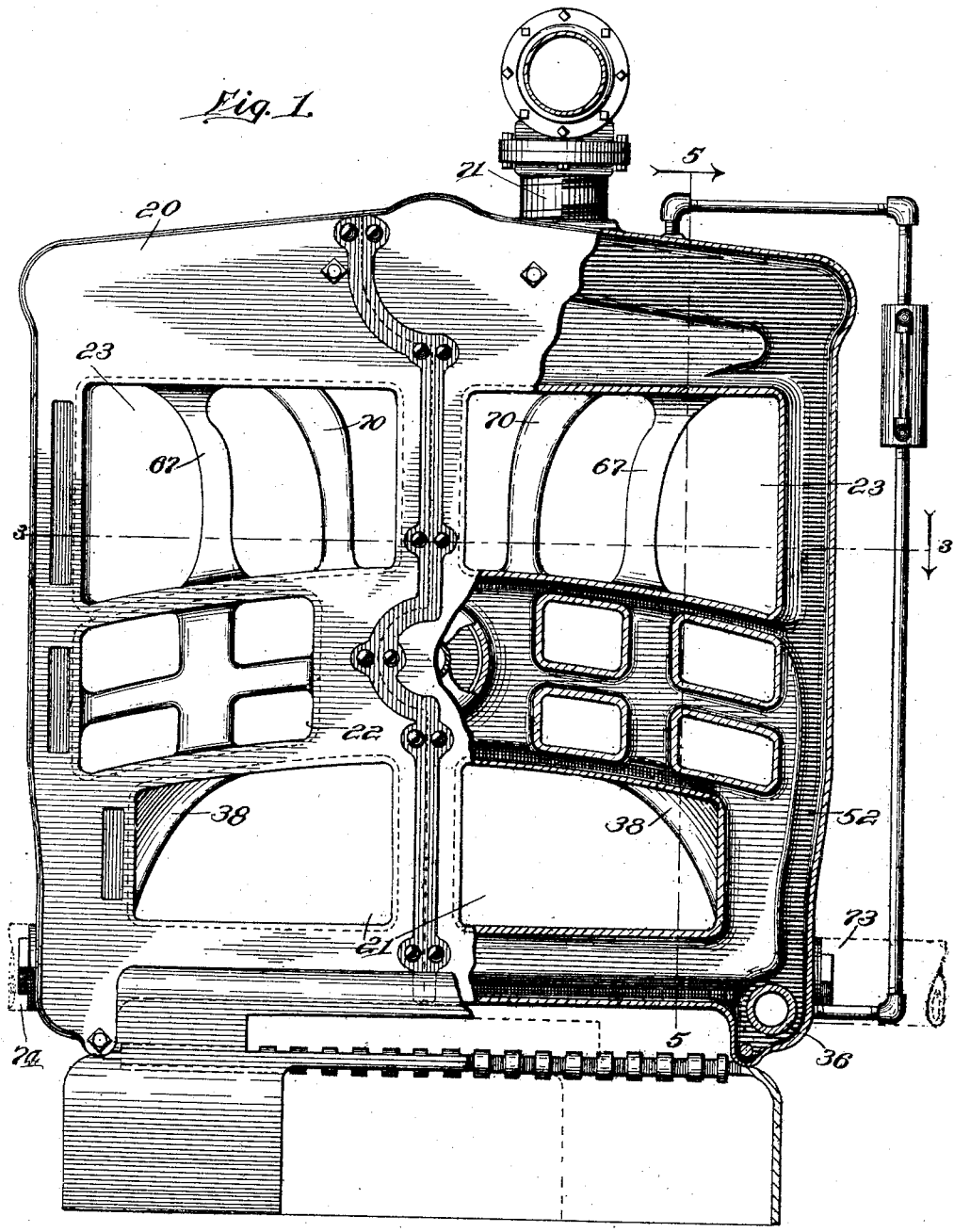
Figure 2:
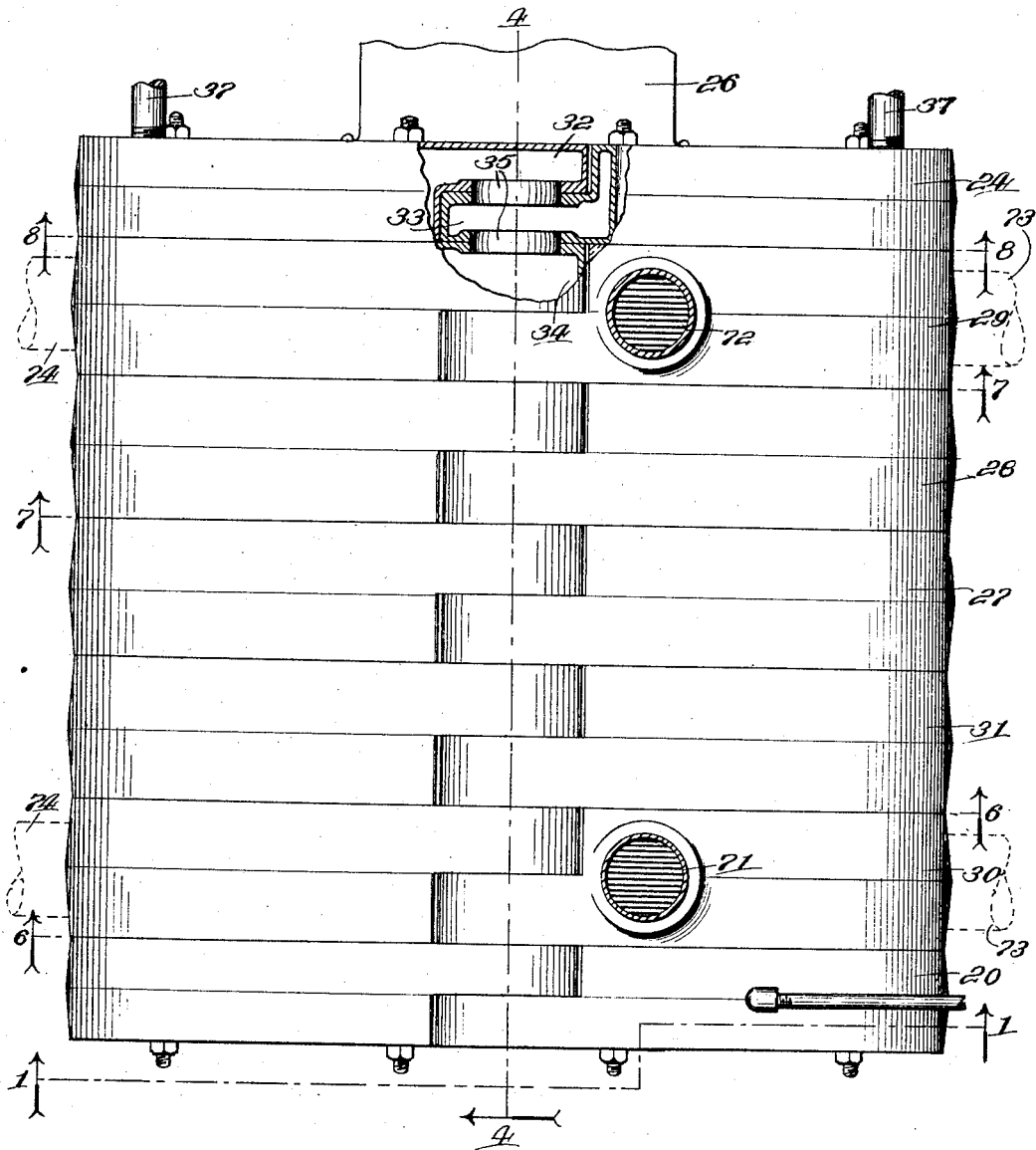
Figure 3:
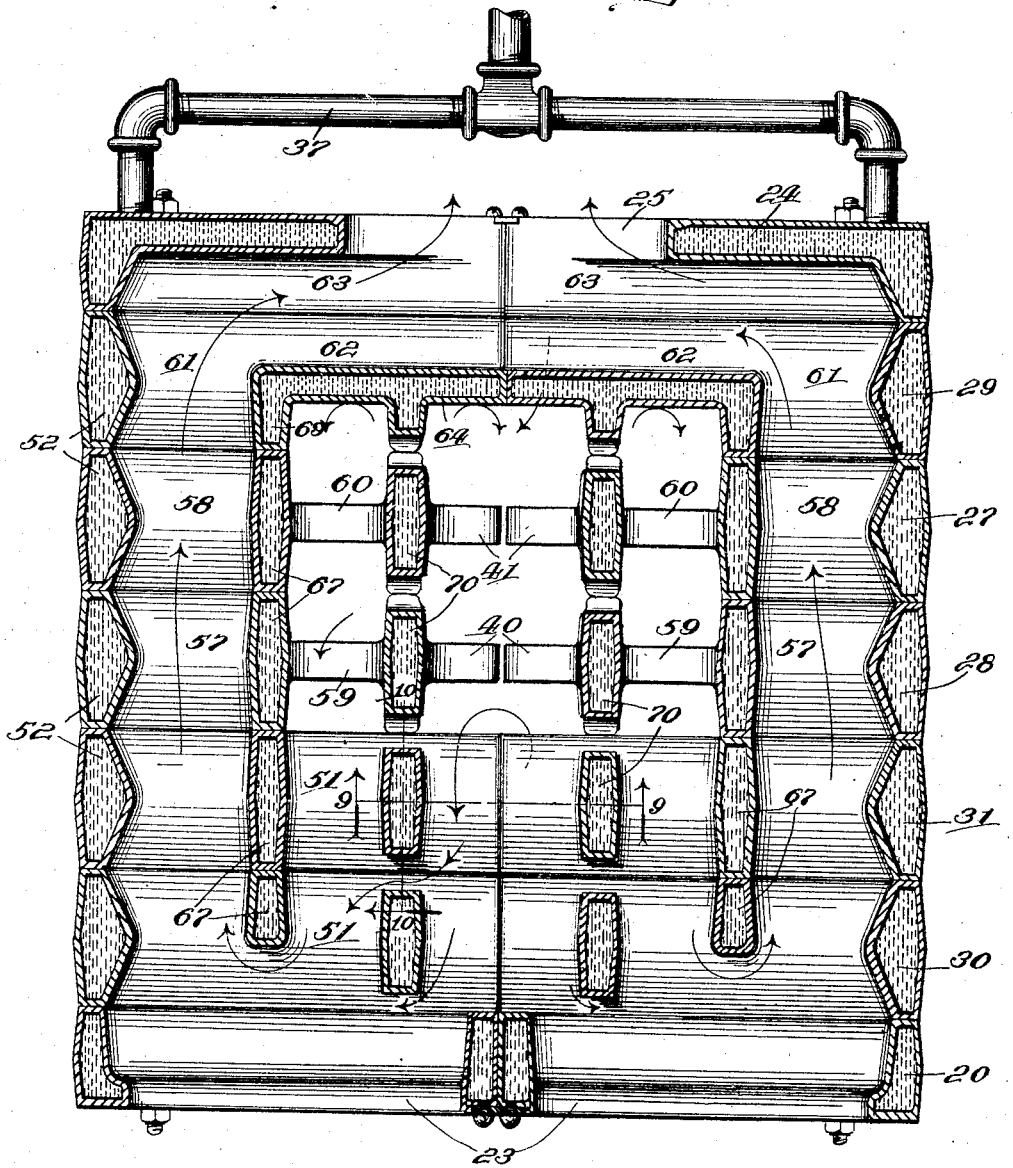

Figure 1 is a front view of the boiler, some of the parts being broken away and the doors being indicated in dotted lines. Fig. 2 is a plan view of the boiler, partly broken away to show the internal construction. Fig. 3 is a plan section on the line 3 3 of Fig. 1, some of the parts being omitted for the sake of clearness. Fig. 4 is a longitudinal vertical central section taken on the line 4 4 of Fig. 2. Fig. 5 is a detail longitudinal vertical section on the line 5 5 of Fig. 1. Figs. 6, 7, and 8 are elevations of various sections of the boiler, some of the parts being broken away in Figs. 6 and 7, taken, respectively, on the lines 6 6, 7 7, and 8 8 of Fig. 2. Figs. 9 and 10 are detail sections taken on the lines 9 9 and 10 10, respectively, of Fig. 3.

The boiler is composed of six different forms of sections. The front section 20 is provided with door-openings 21 21 to the fire-box and 22 and 23 23 opening to the flue-spaces. The rear section 24 is provided with an eduction-flue passage 25 for communication with the stack, as by means of a flue-pipe 26. At the center of the boiler are located the central sections 27 28, which are preferably identical in form and may be of any desired number, according to the size of the boiler. Between these sections and the rear section 24 is placed a connecting-section 29, so formed as to cut off the central flues from the eduction-flue 25.

Adjacent the front section 20 is the front flue-section 30, so formed as to connect the central with the side flues, and interposed between the section 30 and the forward central section 28 is a connecting-section 31, arranged to continue the central flues forwardly.

All of the sections except the front and rear ones may be generally described as U-shaped, each having an arch portion forming the dome of the boiler and water-legs leading downwardly therefrom and flanking the fire-box, intermediate water-legs being provided, as hereinafter described, which provide for the circulation of the water and for the flue arrangement. The front and rear sections are preferably hollow throughout their entire areas. The intermediate sections arch inwardly from their water-legs, forming a species of crown-sheet. The central sections have this arch open, as plainly shown in Fig. 3, to allow the ascent of the vapors to the central and forwardly-directed flues. The connecting-section 31 and the section 30, located adjacent the front section, are provided with a closed arch, thereby forming a continuation forwardly of the central flue and cutting it off from communication with the fire-box.

Each of the intermediate sections is provided with inner water-legs, adjacent faces of which abut to form a continuous flue-partition. The line of draft therefore is, as indicated by the arrows in Figs. 3, 4, and 5, upwardly through the open arch of the central sections 27 28, and forwardly to the front section, and thence laterally in both directions, (the inner water-legs of the section 30 being of less width than the section,) and backwardly through the side flues located between the outer and inner water-legs, (these flues uniting at the back of the boiler, the inner water-leg of the section 29 being of less width than the section and the width of the rear section 24 being reduced in the line of the flue,) and to the eduction-passage 25, and thence to the stack. Allusion has already been made to the fact that section 29 is provided with a vertical wall for separating the eduction-flue from the central flue. This wall connects the inner water-legs of this section, as shown. This flue arrangement concentrates the vapors when at their maximum temperature at the center of the boiler and discharges them through the side flues, where they come in contact with the water-legs carrying the descending, and hence the cooler, water-currents—a flue arrangement which contributes largely to the rapid and proper direction of circulation of the water within the boiler, as will be more clearly pointed out.

Each of the sections is made in two parts which are united along the median line of the boiler, and their water-chambers are connected at the top by means of overlapping lugs, as indicated at 32, 33, and 34, (most clearly shown in Fig. 2 and appearing also in Fig. 4,) adjacent faces of these lugs having registering apertures within which are fitted push-rings 35, the outer faces of which taper toward each end, thereby uniting the sections and forming steam-tight joints. Adjacent sections are similarly united at the lower ends of their outer water-legs, as indicated at 36, and a blow-off pipe 37 leads from the bottom of the boiler at each side, as shown, from the foot of the rear section, thereby providing means for draining the entire water-chamber of the boiler.

Referring to the details of construction of the several intermediate sections, it will be seen that each is provided with an instanding hollow rib 38, 39, 40, 41, and 42, formed, respectively, on the sections 30, 31, 28, 27, and 29, this rib taking the form of a half-arch springing from the base of the outer water-leg and extending nearly to the median line of the boiler and then rising abruptly to the bottom of the central flue, its upper inner end being approximately near the median line of the boiler. The thickness of each of these ribs is very much less than that of the section, as shown being approximately about one-fourth of the thickness thereof. Each of these ribs is apertured, as shown at 43 44 45 46, so that its upper portion is divided into an inner and an intermediate water-leg 47 48 and a lower, an intermediate, and an upper cross-arm, (designated, respectively, 49, 50, and 51,) which connect the water-legs 47 and 48 and extend to the outer water-leg 52 of the section.

Each of the lower cross-arms 49 and 50 is provided with laterally and oppositely projecting hollow fins 53 54, extending substantially to the plane of the side of the section, and the heating-surface of these fins is increased by forming its outer end into a thin solid rib 55 56. To avoid confusion in reading the drawings, these fins formed on the ribs 40 and 41 are omitted in Fig. 3 of the drawings.

The cross-arms 51 of the ribs 38 39 of the sections 30 and 31 are of the full thickness throughout their entire length of the section and form the floor of the forward part of the central and side flues. The outer portions of the upper arms of the ribs 40 41 of the sections 28 and 27, respectively, are of corresponding width, as shown at 57 58, forming a continuation of the floor of side flues; but the inner portions of these arms are not widened, as shown at 59 60, thereby providing a passage leading from the fire-box to the central flue.

The upper cross-arm of the rib 42 of the section 29 is of equal thickness at its outer end with the section, thereby forming a continuation of the floor of the side flues, as shown at 61, and is prolonged laterally at its inner end, as shown at 62, to the plane of the rearward side of the section, meeting a similar arm 63 projecting forwardly from the front face of the rearward section 24, continuing the floor of the side flues back of the hollow wall 64, forming the rear end of the central flue. The heating-surfaces of the upper cross-arms 51 of all of the sections are increased by giving their margins and ends the form of solid ribs, as shown at 65 66, Figs. 9 and 10, similar to the ribs 55 and 56.

The sections 27, 28, 30, and 31 are each provided with the inner water-legs 47, already referred to as forming the partition separating the central flue from the return-flues, these water-legs rising from the cross-arms 51 of the ribs to the crown or arch 68 of the section. The hollow partition 64 is provided at its ends with forwardly-projecting extensions 69, abutting against the legs 67 of the section 27, thereby completing the partition between the flues. The sections 27, 28, 30, and 31 are also provided with a second set of water-legs 70, located nearer the median line of the boiler and connecting the cross-arm 51 with the arch 68. These water-legs are of less width than the sections, and hence are spaced apart from each other, permitting the circulation of the gases around and between them.

The water-legs 67 and 70 are inclined outwardly at their upper ends, thus directing the rising currents of water toward the sides of the boiler. By this arrangement the violent ebullition of the water is carried outside of the zone from which the steam-pipes 71 72 are fed, and hence the steam passes out of the boiler much drier than would otherwise be the case.

The described arrangement of flues and water-passages concentrates the heat at the center of the boiler and so directs the water-currents as to promote rapid circulation through this more highly heated portion of the boiler. The return-pipes leading the water of condensation back from the boiler to the heating system enter the boiler at the bottom of its water-legs, as at the points 73 74. Here it is brought under the direct influence of the burning fuel, and the ribs 38 provide for it a direct path upwardly and inwardly to the center of the boiler, where it merges into the currents leading inwardly from the outer water-legs of the boiler-sections, through which the water has descended from the dome of the boiler. There are therefore two cycles of circulation, the one within the boiler itself upwardly through the inner water-legs 67 and 70 and downwardly through the outer water-legs of the sections and thence through the cross-arms 50 and 51, the other through the steam-pipes 71 72 to the heating system and back through the return-pipes 73 74 and thence upwardly through the ribs 38 and the water-legs 67 and 70. These two cycles merge together in such manner as to in no wise conflict; but, on the contrary, the rapid circulation through the cycle entirely within the boiler promotes circulation through the other cycle, tending to draw up the water through the ribs 38, and thereby accelerate the draining of the heating system of the water of condensation.

The form of the sections and the arrangement of the hollow ribs and their hollow fins and of the inner water-legs is such that a very large amount of so-called "radiant" heating-surface is secured. The ribs being apertured and the fins being in alternation, it will be seen that the heat may radiate in straight lines from a bed of fuel within the fire-box to substantially all parts of the surface of the ribs, the fins, and the under faces of the cross-arms 51.

The solid ribs formed at the end of the hollow fins still further increase the area of direct heating-surface, and the solid ribs 65 and 66, forming the meeting-points of certain parts of the sections, permit of the spacing of the hollow portions of the sections, thereby still further increasing the area of direct heating-surface not only upon the walls of the hollow portions, but also to the extent of these ribs, the length of which is so restricted that the heat absorbed by them is rapidly conducted to and carried away by the water.

The flue arrangement brings the gases resulting from combustion when at their maximum temperature into coöperation with the hottest water in the boiler and the gases when at their lowest temperature into coöperation with the coolest water in the boiler, thereby securing the highest average of difference in temperature between the gases and the water. Furthermore, this flue arrangement accelerates the circulation of the water by the application of the greatest heat to those portions of the water-passages through which the currents are ascending. The value of radiant heating-surface is enormously in excess of the value of heating-surface acted upon by convection, and the form and arrangement of the sections of the heater are such that the water-currents acted upon by radiant heat are all ascending and do not conflict with the descending currents.

I claim as my invention—

1. In a sectional boiler, in combination, a plurality of sections in horizontal alinement and being substantially U-shaped and having instanding hollow cross-arms and water-legs leading upwardly therefrom, arranged to form a fire-box, a central flue leading upwardly from the end of the fire-box and to the farther end of the boiler, and return-flues at the same level with the central flue.

2. In a boiler, in combination, a plurality of substantially U-shaped hollow sections in horizontal alinement; the several sections having hollow ribs springing from the lower ends of their legs adjacent the bottom of the fire-box and arching substantially to the center of the boiler, water-legs leading upwardly from the inner ends of the ribs, and hollow cross-arms uniting the last-named legs with the outer legs of the sections.

3. In a boiler, in combination, a plurality of substantially U-shaped hollow sections in horizontal alinement; the several sections having hollow ribs springing from the lower ends of their legs adjacent the bottom of the fire-box and arching substantially to the center of the boiler, water-legs leading upwardly from the inner ends of the ribs and inclining outwardly at their upper ends, and hollow cross-arms uniting the last-named legs with the outer legs of the sections.

4. In a boiler, in combination, a plurality of substantially U-shaped hollow sections in horizontal alinement, each section being formed of two parts united at their upper ends; the several sections having hollow ribs springing from the lower ends of their legs adjacent the bottom of the fire-box and arching substantially to the center of the boiler, water-legs leading upwardly from the inner ends of the ribs and inclining outwardly at their upper ends, and hollow cross-arms uniting the last-named legs with the outer legs of the sections.

5. A substantially U-shaped boiler-section, its side members constituting water-legs extending downwardly at the side of the fire-box of the boiler; such section having instanding hollow cross-arms leading from such water-legs, their width being the same as the thickness of the section; hollow ribs of less width springing from the lower ends of the water-legs and arching inwardly to the median line of the boiler and joining the cross-arms, such ribs being transversely apertured; and hollow fins projecting laterally from the ribs.

6. A substantially U-shaped boiler-section, its side members constituting water-legs extending downwardly at the side of the fire-box of the boiler; such section having instanding hollow cross-arms leading from such water-legs, their width being the same as the thickness of the section; hollow ribs of less width springing from the lower ends of the water-legs and arching inwardly to the median line of the boiler and joining the cross-arms, such ribs being transversely apertured; and hollow fins projecting laterally from the opposite sides of the ribs and being out of horizontal alinement.

7. A substantially U-shaped boiler-section, its side members constituting water-legs extending downwardly at the side of the fire-box of the boiler; such section having instanding hollow cross-arms leading from such water-legs, their width being the same as the thickness of the section; hollow ribs of less width springing from the lower ends of the water-legs and arching inwardly to the median line of the boiler and joining the cross-arms, such ribs being transversely apertured; and hollow fins projecting laterally from the ribs and having solid ribs at their outer ends.

FRANK B. HOWELL.

Witnesses:
J. W. CHATHAM,
D. H. RILEY.